(12) United States Patent
Delp

(10) Patent No.: US 9,037,403 B2
(45) Date of Patent: May 19, 2015

(54) INTENSITY MAP-BASED LOCALIZATION WITH ADAPTIVE THRESHOLDING

(71) Applicant: Toyota Motor Engineering & Manufacturing North America, Inc, Erlanger, KY (US)

(72) Inventor: Michael J. Delp, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 136 days.

(21) Appl. No.: 13/850,935

(22) Filed: Mar. 26, 2013

(65) Prior Publication Data
US 2014/0297092 A1    Oct. 2, 2014

(51) Int. Cl.
*G01C 21/00* (2006.01)
*G05D 1/02* (2006.01)

(52) U.S. Cl.
CPC .................................. *G05D 1/0212* (2013.01)

(58) Field of Classification Search
None
See application file for complete search history.

(56) References Cited

U.S. PATENT DOCUMENTS

| | | | | |
|---|---|---|---|---|
| 5,970,433 | A * | 10/1999 | Oka et al. | 702/159 |
| 5,995,883 | A * | 11/1999 | Nishikado | 701/23 |
| 6,345,217 | B1 * | 2/2002 | Zeitler et al. | 701/23 |
| 7,272,467 | B2 * | 9/2007 | Goncalves et al. | 700/245 |
| 7,689,321 | B2 * | 3/2010 | Karlsson | 700/253 |
| 7,725,253 | B2 * | 5/2010 | Foxlin | 701/519 |
| 7,969,558 | B2 * | 6/2011 | Hall | 356/5.01 |
| 8,150,650 | B2 * | 4/2012 | Goncalves et al. | 702/150 |
| 8,200,423 | B2 * | 6/2012 | Dietsch et al. | 701/409 |
| 8,401,783 | B2 * | 3/2013 | Hyung et al. | 701/301 |
| 8,478,472 | B2 * | 7/2013 | Bageshwar et al. | 701/26 |
| 8,508,388 | B2 * | 8/2013 | Karlsson et al. | 340/995.1 |
| 8,510,039 | B1 * | 8/2013 | Troy et al. | 701/436 |
| 8,588,471 | B2 * | 11/2013 | Hsieh et al. | 382/106 |
| 8,630,805 | B2 * | 1/2014 | Becker et al. | 701/514 |
| 8,666,657 | B2 * | 3/2014 | Meadow et al. | 701/436 |
| 2004/0073360 | A1 * | 4/2004 | Foxlin | 701/207 |
| 2006/0012493 | A1 * | 1/2006 | Karlsson et al. | 340/995.24 |
| 2007/0233336 | A1 * | 10/2007 | Serguei et al. | 701/23 |
| 2008/0027591 | A1 * | 1/2008 | Lenser et al. | 701/2 |

(Continued)

OTHER PUBLICATIONS

Rojo et al., "Spirit of Berlin: An Autonomous Car for the DARPA Urban Challenge Hardware and Software Architecture", Team Berlin, Jun. 1, 2007 in 25 pages.
Levinson, et al. "Robust Vehicle Localization in Urban Environments Using Probabilistic Maps", 2010 IEEE International Conference on Robotics and Automation, Anchorage Convention District, May 3-8, 2010, pp. 4372-4378, Anchorage, Alaska, USA.
Levinson, et al., "Map-Based Precision Vehicle Localization in Urban Environments", Stanford Artificial Intelligence Laboratory, Proceedings of Robotics: Science and Systems, Jun. 2007, Atlanta, GA, USA in 8 pages.

*Primary Examiner* — Thomas Tarcza
*Assistant Examiner* — Richard Goldman
(74) *Attorney, Agent, or Firm* — Christopher G. Darrow; Young Basile Hanlon & MacFarlane P.C.

(57) ABSTRACT

A system, device, and methods for autonomous navigation using intensity-based localization. One example computer-implemented method includes receiving data including a plurality of intensity values from one or more sensors disposed on a vehicle as the vehicle traverses a route and generating a first group of intensity values wherein the first group includes at least some of the plurality of intensity values received. The method further includes removing the intensity values below an adaptive threshold from the first group of intensity values to generate a second group of intensity values, comparing the second group of intensity values to an intensity map, and generating a localized vehicle position based on the comparison between the second group of intensity values and the intensity map.

20 Claims, 6 Drawing Sheets

(56) References Cited

U.S. PATENT DOCUMENTS

| | | | |
|---|---|---|---|
| 2008/0033645 A1* | 2/2008 | Levinson et al. | 701/213 |
| 2009/0214114 A1* | 8/2009 | Bengtsson et al. | 382/170 |
| 2009/0248304 A1* | 10/2009 | Roumeliotis et al. | 701/220 |
| 2010/0114416 A1* | 5/2010 | Au et al. | 701/23 |
| 2010/0217529 A1* | 8/2010 | Stroila et al. | 702/5 |
| 2010/0256836 A1* | 10/2010 | Mudalige | 701/2 |
| 2010/0274481 A1* | 10/2010 | Krishnaswamy et al. | 701/208 |
| 2010/0286905 A1* | 11/2010 | Goncalves et al. | 701/200 |
| 2012/0089292 A1* | 4/2012 | Naimark et al. | 701/23 |
| 2013/0080045 A1* | 3/2013 | Ma et al. | 701/408 |
| 2013/0131985 A1* | 5/2013 | Weiland et al. | 701/516 |
| 2013/0332064 A1* | 12/2013 | Funk et al. | 701/409 |
| 2014/0172296 A1* | 6/2014 | Shtukater, Aleksandr | 701/522 |

* cited by examiner

INTENSITY MAP-BASED LOCALIZATION WITH ADAPTIVE THRESHOLDING

BACKGROUND

It is desirable that a navigation system for an autonomous vehicle be able to determine the location of the vehicle with a sufficient degree of accuracy. Calculating a precise physical position for the vehicle in respect to a representation of its surroundings can be referred to as localization. Localization can be performed for autonomous vehicles by comparing a representation of the current position of the vehicle in respect to a road or other geographic features to a representation of the same road or features recorded on a detailed virtual map.

SUMMARY

A system, device, and methods for improved intensity-based localization.

In one implementation, an autonomous navigation system using intensity-based localization is disclosed. The system includes one or more sensors disposed on a vehicle and a computing device in communication with the one or more sensors. The computing device includes one or more processors for controlling the operations of the computing device and a memory for storing data and program instructions used by the one or more processors. The one or more processors are configured to execute instructions stored in the memory to receive data including a plurality of intensity values from the one or more sensors as the vehicle traverses a route, generate a first group of intensity values wherein the first group includes at least some of the plurality of intensity values received, remove the intensity values below an adaptive threshold from the first group of intensity values to generate a second group of intensity values, compare the second group of intensity values to an intensity map, and generate a localized vehicle position based on the comparison between the second group of intensity values and the intensity map.

In another implementation, a computer-implemented method for autonomous navigation using intensity-based localization is disclosed. The method includes receiving data including a plurality of intensity values from one or more sensors disposed on a vehicle as the vehicle traverses a route, generating a first group of intensity values wherein the first group includes at least some of the plurality of intensity values received, removing the intensity values below an adaptive threshold from the first group of intensity values to generate a second group of intensity values, comparing the second group of intensity values to an intensity map, and generating a localized vehicle position based on the comparison between the second group of intensity values and the intensity map.

In another implementation, a computing device is disclosed. The computing device includes one or more processors for controlling the operations of the computing device and a memory for storing data and program instructions used by the one or more processors. The one or more processors are configured to execute instructions stored in the memory to receive data including a plurality of intensity values from one or more sensors disposed on a vehicle as the vehicle traverses a route, generate a first group of intensity values wherein the first group includes at least some of the plurality of intensity values received, remove the intensity values below an adaptive threshold from the first group of intensity values to generate a second group of intensity values, compare the second group of intensity values to an intensity map; and generate a localized vehicle position based on the comparison between the second group of intensity values and the intensity map.

BRIEF DESCRIPTION OF THE DRAWINGS

The description herein makes reference to the accompanying drawings wherein like reference numerals refer to like parts throughout the several views, and wherein.

DETAILED DESCRIPTION

An autonomous navigation system using improved intensity-based localization and methods for implementing the system is described below. The system can include a computing device in communication with one or more sensors disposed on a vehicle. In a method of using the system, at least one sensor can collect data based on light reflection from the area surrounding the vehicle while the vehicle traverses a route. The method can also include generating a first group of intensity values that represent a specific location of the vehicle and removing the intensity values below an adaptive threshold to generate a second group of intensity values. The second group of intensity values can include only the brightest intensity values of the first group, allowing generation of a clear, distinct intensity map for the given vehicle location that includes representations of relevant features such as curbs, lane lines, road edges, and road signs but excludes less relevant features such as pavement or grass. The method can also include comparing the second group of intensity values to an intensity map in order to generate a localized vehicle position.

Figure 1:
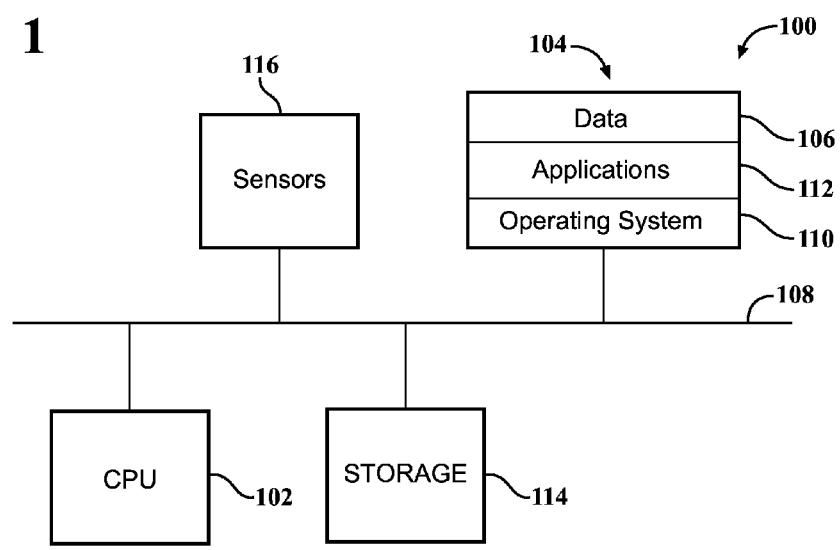
FIG. 1 is a block diagram of a computing device.

FIG. 1 is a block diagram of a computing device 100. The computing device 100 can be any type of vehicle-installed, handheld, desktop, or other form of single computing device, or can be composed of multiple computing devices. The CPU 102 in the computing device 100 can be a conventional central processing unit or any other type of device, or multiple devices, capable of manipulating or processing information. The memory 104 in the computing device 100 can be a random access memory device (RAM) or any other suitable type of storage device. The memory 104 can include data 106 that is accessed by the CPU 102 using a bus 108. The memory 104 can also include an operating system 110 and installed applications 112, the installed applications 112 including programs that permit the CPU 102 to perform the intensity-based localization methods described here.

The computing device 100 can also include additional storage 114, for example, a memory card, flash drive, or any other form of computer readable medium. The installed applications 112 can be stored in whole or in part in the secondary storage 114 and loaded into the memory 104 as needed for processing. The computing device 100 can also include, or be coupled to, one or more sensors 116. The sensors 116 can capture data for processing by an inertial measurement unit (IMU), an odometry system, a GPS system, a light detection and ranging (LIDAR) system, or any other type of system capable of capturing vehicle and/or positional data and outputting signals to the CPU 102.

If the sensors 116 capture data for an IMU, changes in x, y, and z acceleration and rotational acceleration for the vehicle can be captured. If the sensors 116 capture data for an odometry system, data relating to wheel revolution speeds and steering angle can be captured. If the sensors 116 capture data for a GPS system, a receiver can obtain vehicle position estimates in global coordinates based on data from one or more satellites. If the sensors 116 capture data for a LIDAR system, data relating to intensity or reflectivity returns of the area surrounding the vehicle can be captured. In the examples described below, the sensors 116 can capture, at least, data for a GPS system and a LIDAR system in order to improve positional accuracy of an autonomous vehicle.

Figure 2:
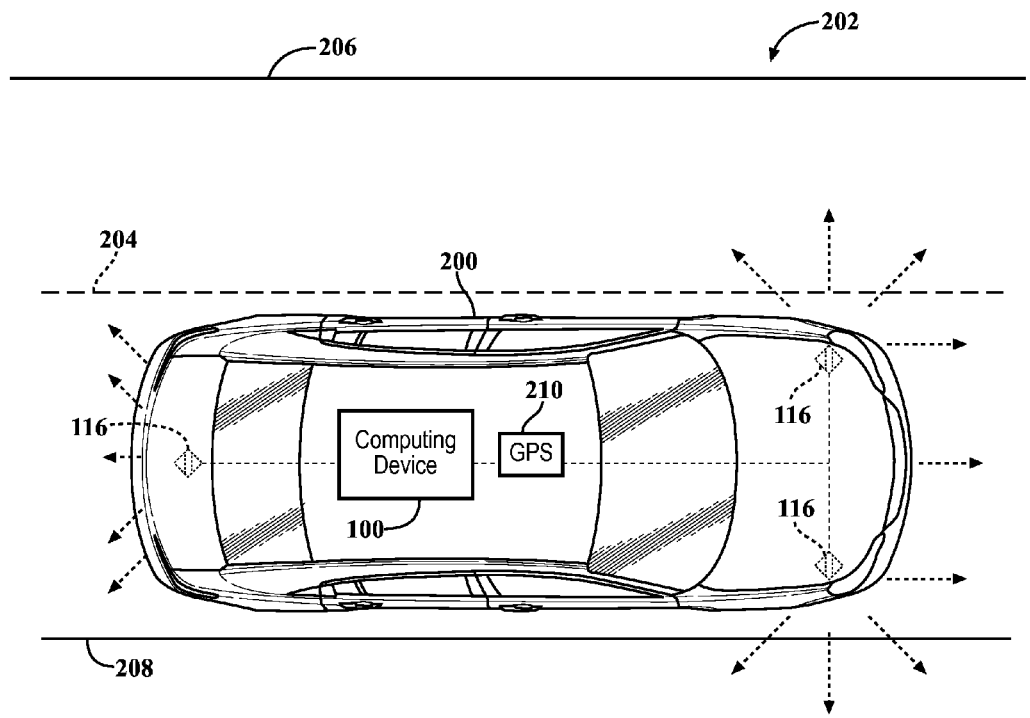
FIG. 2 shows a schematic of a vehicle including the computing device of FIG. 1.

FIG. 2 shows a schematic of a vehicle 200 including the computing device 100 of FIG. 1. The vehicle 200 is traversing a route along a road 202. The road 202 includes a dotted center line 204 as well as road edges 206, 208. The road edges 206, 208 can include edge lines, but the exemplary road 202 shown in FIG. 2 does not have edge lines. The computing device 100 can be located within the vehicle 200 as shown in FIG. 2 or can be located remotely from the vehicle 200. If the computing device 100 is remote from the vehicle, the vehicle 200 can include the capability of communicating with the computing device 100. The vehicle 200 can also include a GPS 210 capable of measuring vehicle position in global coordinates based on data from one or more satellites. The GPS 210 can send data related to vehicle position to the computing device 100.

The vehicle 200 can also include a plurality of sensors 116. In one exemplary autonomous navigation system, the sensors 116 can be located around the perimeter of the vehicle as shown in FIG. 2. Each sensor 116 can capture data that can be processed using a LIDAR system, with the LIDAR system in communication with the computing device 100. When in communication with a LIDAR system, the sensors 116 can capture and send data related to the laser returns from physical objects in the area surrounding the vehicle 200, for example, the laser returns from the center line 204 and road edges 206, 208 as the vehicle 200 travels along the road 202. Laser returns can include the backscattered light reflected by objects hit by a source of light, e.g. laser light, being emitted by the sensors 116 present on the vehicle 200. The light can also be emitted by another source on the vehicle 200. Once the light is reflected by the surrounding objects, the sensors 116 can capture intensity values, a reflectivity measure that indicates the brightness of the laser returns.

Figure 3B:
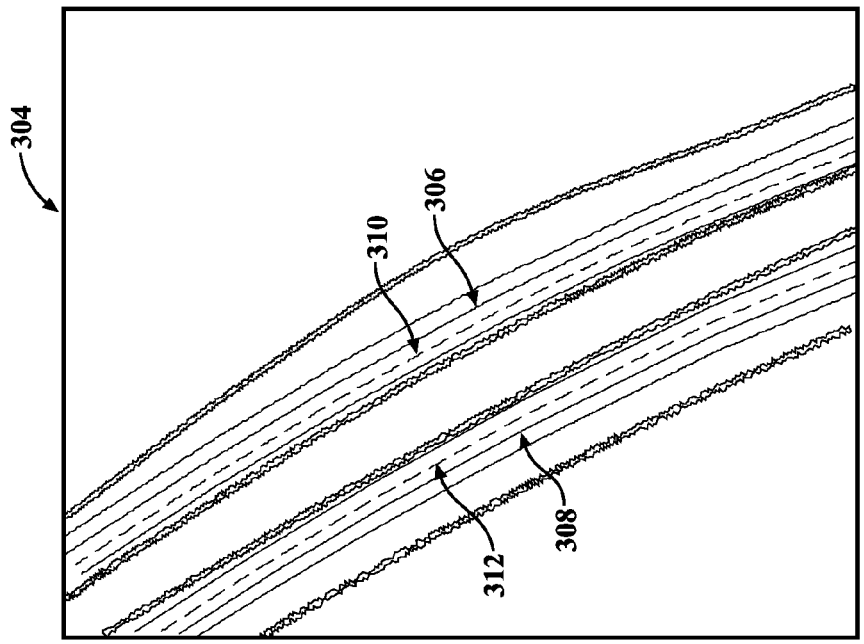
FIG. 3B shows an exploded view of the intensity map of FIG. 3A.
Figure 3A:
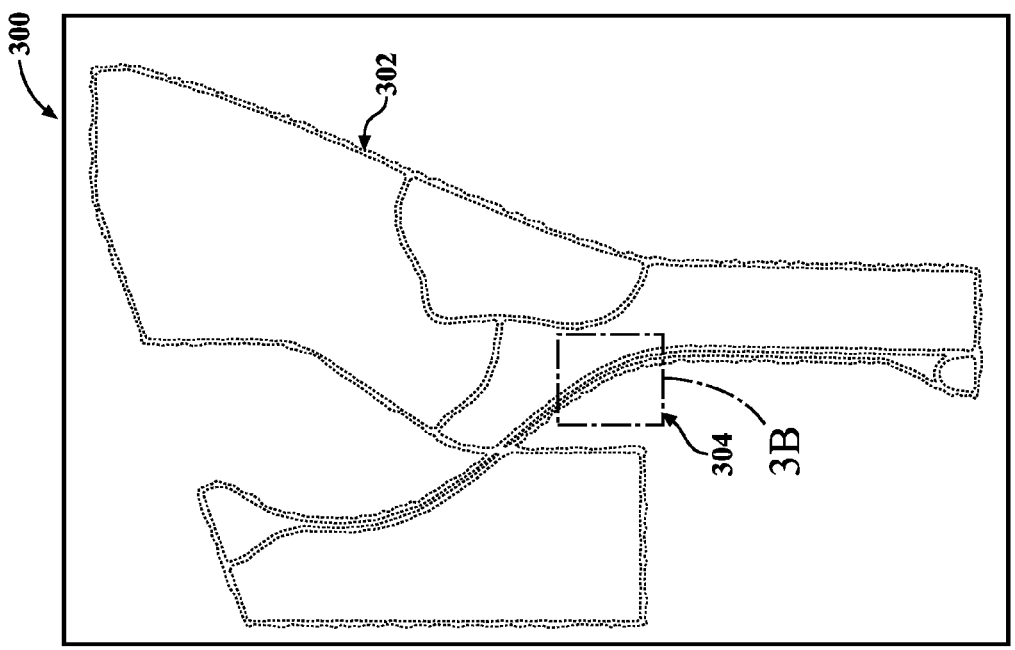
FIG. 3A shows an exemplary two-dimensional representation of an intensity map of an exemplary route traversed by the vehicle of FIG. 2.

FIG. 3A shows an exemplary two-dimensional representation of an intensity map 300. The intensity map 300 includes intensity return data, e.g. intensity values, representing an exemplary route 302 traversed by the vehicle 200 of FIG. 2. The intensity map 300 can be based on multiple data runs, that is, multiple traversals of the route 302, with the sensors 116 capturing intensity values during each data run. The intensity values captured during the multiple runs can be combined and processed, for example, using a simultaneous mapping and localization routine (SLAM) to smooth the overlap between the various runs. In addition, the intensity map 300 can be processed to remove any intensity values that represent obstacles, such as other vehicles, people, or animals captured during one of the runs that would not normally be present along the route 302. The resulting intensity map 300 can be used to assist in localizing the vehicle 200 during subsequent autonomous navigation of the route 302.

A portion of the route 302, detail map 304, is also shown in FIG. 3B. The detail map 304 shows that the route 302 at the detailed location is a divided road having spaced lanes 306, 308 each wide enough for two vehicles and divided by dotted center lines 310, 312. The edges of the lanes 306, 308 and the dotted center lines 310, 312 appear as bright entities against a dark background. The light reflected back to the sensors 116 on the vehicle 200 from the edges of the lanes 306, 308 and the dotted center lines 310, 312 has higher intensity values than the light reflected from the pavement and surrounding foliage. The intensity map 300 can also be processed to remove intensity values below an adaptive threshold to better highlight the features of the lanes 306, 308 and center lines 310, 312 for later comparison as is described in conjunction with the intensity-based localization system and methods below.

Figure 4A:
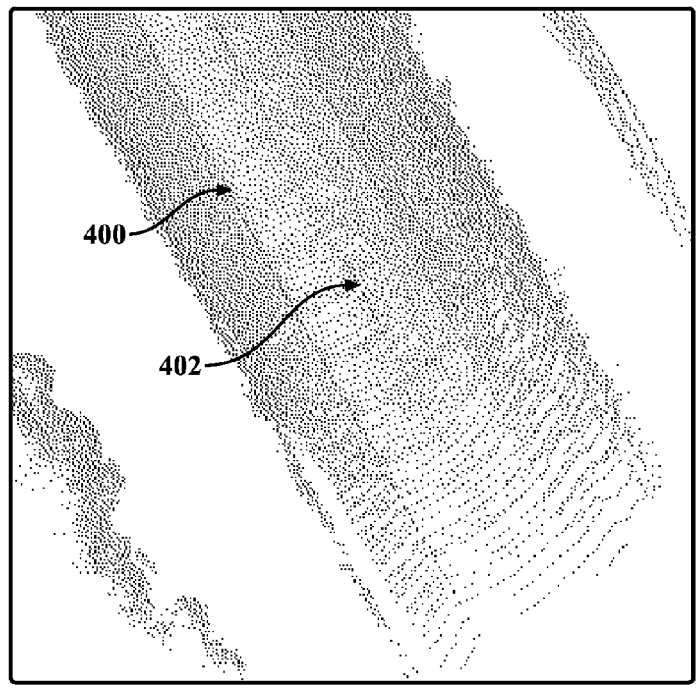
FIG. 4A shows an exemplary two-dimensional representation of a group of intensity values captured as the vehicle of FIG. 2 traverses a route such as the route represented in FIG. 3A.

FIG. 4A shows an exemplary two-dimensional representation of a group of intensity values captured as the vehicle 200 of FIG. 2 traverses a route such as the route 302 represented in FIG. 3A. The group of intensity values can include intensity values captured within a predetermined distance from the vehicle 200 as the vehicle 200 traverses the route 302. In a similar manner as described above in reference to the intensity map 300, the intensity values captured while the vehicle 200 traverses the route 302 can be processed to remove obstacles and isolate the terrain surrounding the vehicle 200. For example, the group of intensity values can include data accumulated over the last 40 meters of travel by the vehicle 200, with the distance being selected for compliance with the capability of the sensors 116 as well as the amount of data needed for subsequent matching to a portion of an intensity map, such as intensity map 300. The distance can be 40 meters or any other distance that allows efficient comparison.

As can be seen in FIG. 4A, collecting a group of intensity values that includes all laser returns from the surrounding area can lead to a cluttered two-dimensional representation of the route that the vehicle 200 is currently traversing without sufficient distinction between the intensity values. For example, the intensity values representing the edge of a lane 400, the dotted center line 402, and the pavement or surrounding grass, gravel, or foliage are all relatively close to each other and can be perceived as indistinct due to various conditions, e.g. sunlight, the black color of the pavement, the fading color of aging pavement, etc.

Figure 4B:
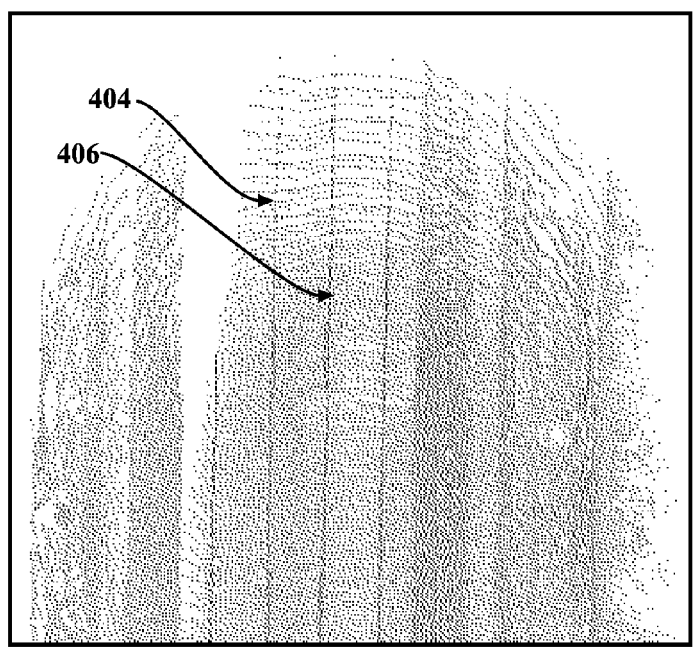
FIG. 4B shows another exemplary two-dimensional representation of a different group of intensity values captured as the vehicle of FIG. 2 traverses a route such as the route represented in FIG. 3A.

FIG. 4B shows another exemplary two-dimensional representation of a different group of intensity values captured as the vehicle 200 of FIG. 2 traverses a route such as the route 302 represented in FIG. 3A. In this example, the vehicle 200 is traveling along a different portion of the route 302 than the example in FIG. 4A, so a different set of intensity values is captured. The vehicle 200 can also travel under different conditions than were experienced while the vehicle was traveling the portion of the route 302 seen in FIG. 4A. For example, the vehicle 200 can be traveling under cloud cover, at night, during rain, etc. When the driving conditions differ between portions of the route 302, the intensity values collected, for example, those representing an edge of a lane 404 or a dotted center line 406, can also differ in range from intensity values collected on a different portion of the route 302.

FIG. 4B also shows a cluttered two-dimensional representation of the laser returns. Again, the distinction between the edge of a lane 404, the dotted center line 406, and the pavement or surrounding grass, gravel, or foliage is not clear. In order to improve the accuracy of vehicle positioning when comparing the intensity values captured as the vehicle 200 traverses the route 302 to the intensity map 300, some of the intensity values can be removed to better isolate the geographic features more conducive to matching, such as edges of lanes 400, 404 or center lines 402, 406.

Figure 5A:
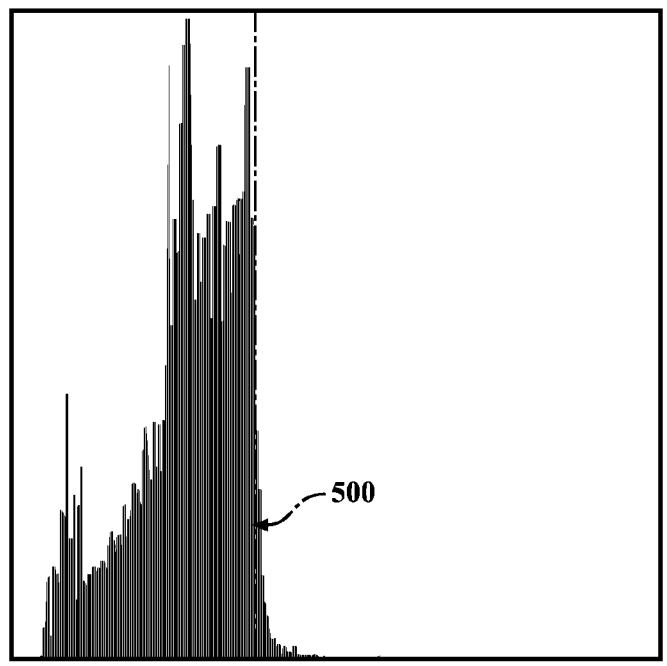
FIG. 5A shows an example histogram generated from the group of intensity values shown in FIG. 4A and marked with an example adaptive threshold.

FIG. 5A shows an exemplary histogram generated from the group of intensity values shown in FIG. 4A and marked with an exemplary adaptive threshold 500. The histogram builds from an intensity value of zero on the far left to an intensity value of 255 on the far right. In order to set the adaptive threshold 500, the histogram is integrated to define the intensity value in the histogram below which a fixed percentage of the group of intensity values fall. In the example of FIG. 5A, the adaptive threshold 500 is set at 95%. That is, 95% of the intensity values present in the histogram of FIG. 5A fall below the adaptive threshold 500, and 5% of the intensity values are higher than the adaptive threshold 500.

By establishing a threshold in general, the background intensity values, which represent such objects as gravel and pavement, can be removed from the rest of the intensity values, leaving only the brightest intensity values representing desirable geographic features such as lane lines, curbs, center lines, street signs, edges of the road, etc. in the set of data. Using an adaptive threshold, such as adaptive threshold 500, is an improvement over using a fixed threshold, such as a fixed intensity value. This is because a fixed threshold does not account for different conditions, such as different lighting when the intensity values are collected, different road surfaces present along the route 302, or different sensors being used on different vehicles. The adaptive threshold 500 can account for various conditions experienced while the vehicle 200 traverses the route 302. The improvement can be seen by comparing FIG. 5A to FIG. 5B.

Figure 5B:
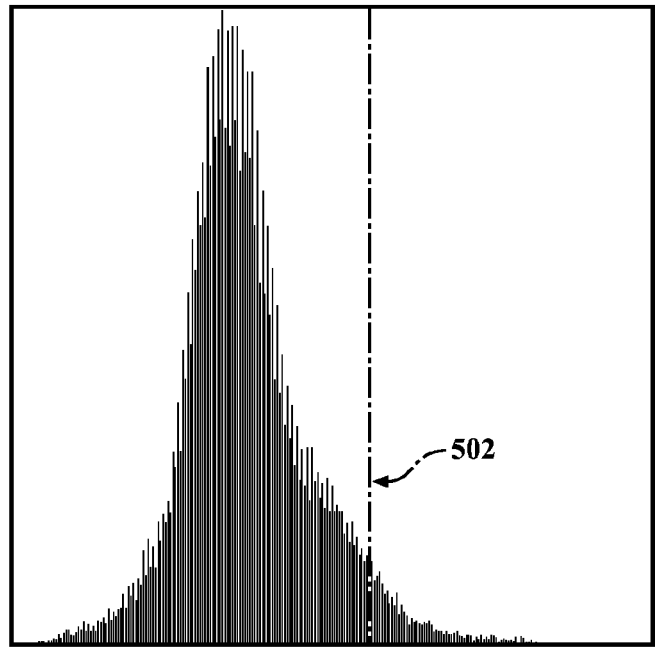
FIG. 5B shows another exemplary histogram generated from the different group of intensity values shown in FIG. 4B and marked with another exemplary adaptive threshold.

FIG. 5B shows another exemplary histogram generated from the different group of intensity values shown in FIG. 4B and marked with another exemplary adaptive threshold 502. As in FIG. 5A, the adaptive threshold 502 in FIG. 5B is calculated such that 95% of the intensity values fall below the adaptive threshold 502 and 5% of the intensity values are higher than the adaptive threshold 502. However, the intensity value at which this occurs is higher in the histogram of FIG. 5B than in the histogram of FIG. 5A. The difference in the adaptive thresholds 500, 502 reflects the difference in the driving or environmental conditions present during the collection of intensity values as the vehicle 200 traverses different portions of the route 302. As brightness varies in the environment, the variation is accounted for in the adaptive threshold 500, 502.

Figure 6A:
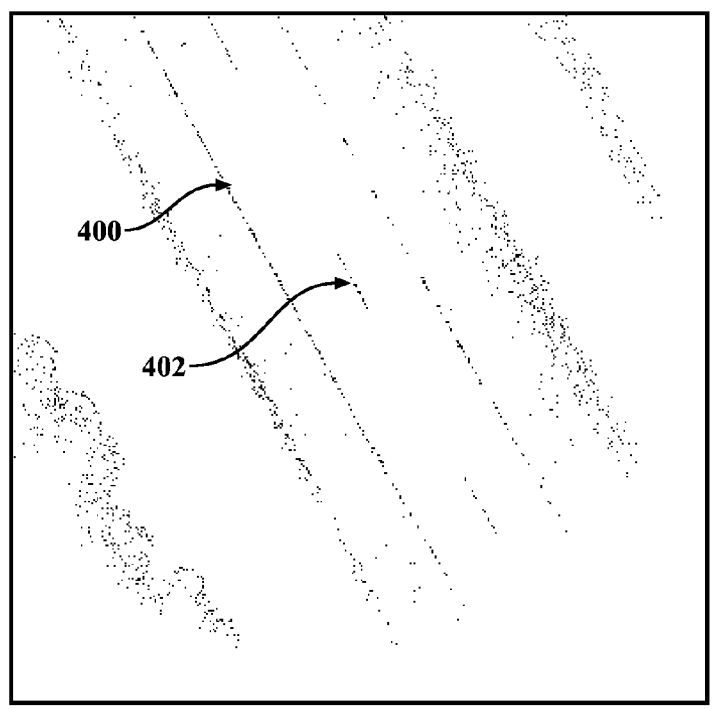
FIG. 6A shows an exemplary two-dimensional representation of a filtered group of intensity values based on the group of intensity values of FIG. 4A and the adaptive threshold of FIG. 5A.

FIG. 6A shows an exemplary two-dimensional representation of a filtered group of intensity values based on the group of intensity values of FIG. 4A and the adaptive threshold 500 of FIG. 5A. The filtering process can be described as follows: the intensity values shown in FIG. 4A can include all (non-obstacle based) intensity values captured within a predetermined distance from the vehicle 200 as it traverses a portion of the route 302. This is an exemplary first group of intensity values. A histogram, such as the histogram in FIG. 5A can be generated using the first group of intensity values, and an adaptive threshold, such as adaptive threshold 500, can be determined by integrating the histogram for the first group of intensity values to define the location below which a fixed percentage of the intensity values fall, in this example, 95%. Next, the intensity values below the adaptive threshold 500 can be removed, leaving only the brightest intensity values for use in intensity-based localization, e.g., a second group of intensity values. The resulting map obtained using only the second group of intensity values is shown in FIG. 6A.

FIG. 6A includes many of the same features as FIG. 4A, such as the edge of the lane 400 and the dotted center line 402, while the intensity values that represent the pavement and a portion of the surrounding foliage have been removed. The resulting map section shown in FIG. 6A with clear, distinguished features, can be compared to a portion of the intensity map 300 of FIG. 3A. To make the processing required for comparison purposes more efficient, the second group of intensity values, those shown in FIG. 6A can be compared to a portion of the intensity map 300. The specific portion to be used for comparison can be selected based on an estimate of the vehicle position using global coordinates supplied by a GPS 210.

Figure 6B:
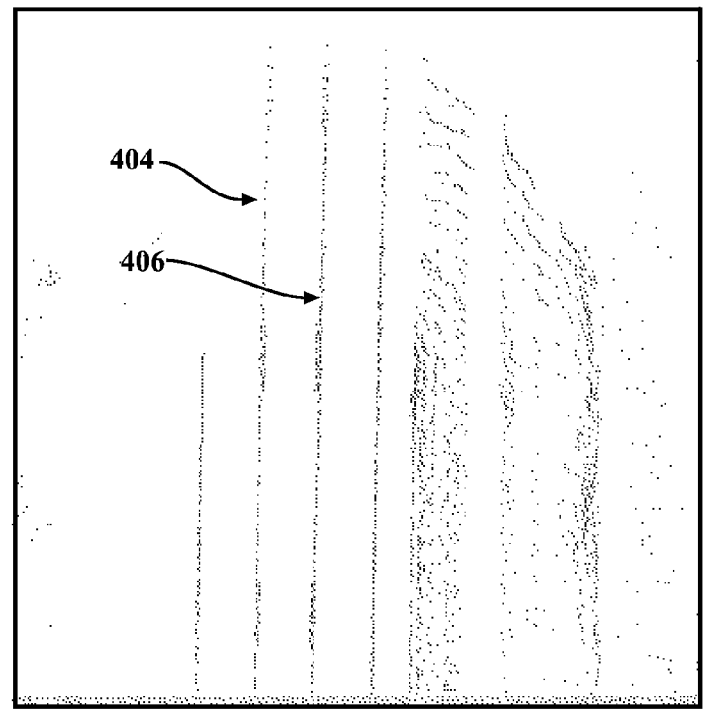
FIG. 6B shows another exemplary two-dimensional representation of a different filtered group of intensity values based on the group of intensity values of FIG. 4B and the adaptive threshold of FIG. 5B.

FIG. 6B shows another exemplary two-dimensional representation of a different filtered group of intensity values based on the group of intensity values of FIG. 4B and the adaptive threshold 502 of FIG. 5B. The filtering process described above in relation to FIG. 6A also applies to FIG. 6B. The exemplary first group intensity values is shown in FIG. 4B. The adaptive threshold 502 is calculated using the histogram of FIG. 5B, and the intensity values below the adaptive threshold 502 are removed, leaving the second group of intensity values shown in FIG. 6B. Again, the desired features such as the edge of the lane 404 and center line 406 are clear and distinct in FIG. 6B.

Figure 7:
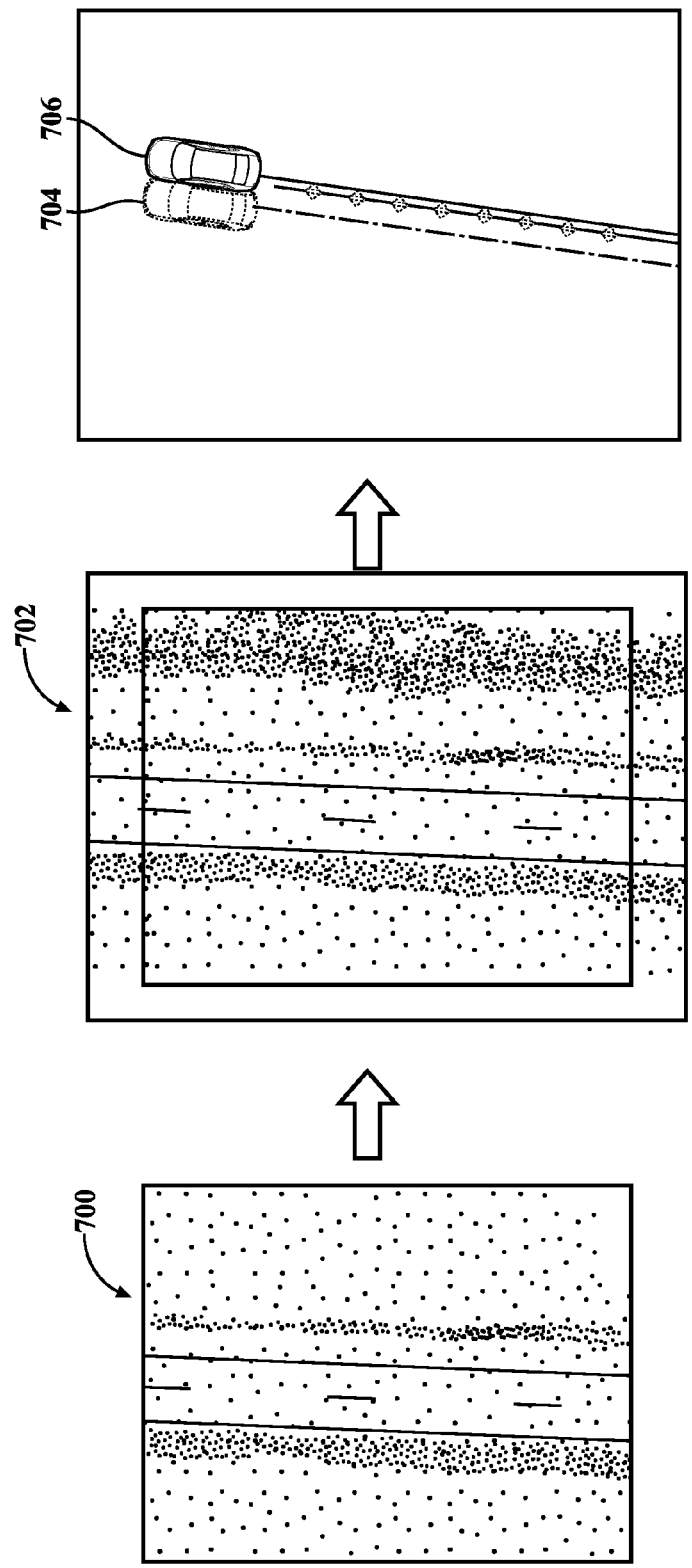
FIG. 7 shows an exemplary schematic process for generating a localized vehicle position based on the comparison between the representation of an exemplary filtered group of intensity values and an exemplary portion of an intensity map.

FIG. 7 shows an exemplary schematic process for generating a localized vehicle position based on the comparison between the exemplary representation 700 of a filtered group of intensity values and an exemplary portion 702 of an intensity map. As described above, the portion 702 of the intensity map used for comparison can be selected based on the estimated position of the vehicle in global coordinates. In FIG. 7, the estimated vehicle position based on global coordinates is shown using vehicle 704.

The representation 700 including the filtered group of intensity values can be matched using cross correlation to the portion 702 of the intensity map. Since two-dimensional images are being compared, an algorithm from visual processing called template matching can be used to pinpoint the location of the vehicle. The algorithm compares overlapped patches of the representation 700 and the portion 702 of the intensity map to determine the location of the vehicle traversing a route, such as vehicle 200 and route 302. Normalized results are fed into a particle filter for localization, and the weighted mean of the particles is taken as the most likely position of the vehicle 200. In FIG. 7, the estimated vehicle position using the intensity-based localization process is shown using vehicle 706. Vehicle 706 is some distance to the right of vehicle 704, indicating that the global coordinate position, as shown by vehicle 704, does not adequately represent the intensity-based localized position, as shown by vehicle 706.

Several tests have been performed using the improved intensity-based localization algorithm described above. As a first baseline, a localizing algorithm making a positional determination for a vehicle using data from a GPS system and an IMU system leads to a lateral localization mean error of 0.269 meters. This position is consistent with the vehicle outline 704 shown in FIG. 7. As a second baseline, an intensity-based positional determination, without implementing the adaptive threshold, used in combination with the GPS and IMU systems, leads to a lateral localization mean error of 0.187 meters. Finally, by implementing the adaptive threshold described above, the lateral localization mean error decreases to 0.153 meters. This position is consistent with the vehicle 706 shown in FIG. 7. Overall, the adaptive threshold technique described here leads to a 22% improvement over the unfiltered intensity-based determination and a 75% improvement over the GPS and IMU system-based determination.

One exemplary method for intensity-based localization using the system described in FIGS. 1-7 above includes receiving data including a plurality of intensity values from one or more sensors, e.g. sensors 116, disposed on a vehicle, e.g. vehicle 200, as the vehicle traverses a route, e.g. route 302, as shown in FIG. 2. The method can further include generating a first group of intensity values. The first group of intensity values can include at least some of the plurality of intensity values received. As described above, the vehicle 200 can traverse the route 302, and the sensors 116 can collect data within a predetermined distance from the vehicle 200. As the vehicle 200 moves along the route 302, more and more data are accumulated. The first group of intensity values can include data from one snapshot in time covering one specific location for data collection. That is, the first group of intensity values can be updated as the vehicle 200 traverses the route 302, for example, as an accumulated grid dependent upon the predetermined distance for measurement and the physical location of the vehicle 200.

The exemplary method further includes removing the intensity values below an adaptive threshold, e.g. adaptive threshold 500 or 502, from the first group of intensity values to generate a second group of intensity values. As described above, the adaptive threshold 500, 502 can be calculated by integrating a histogram of the first group of intensity values to find the specific intensity value below which a fixed percentage of the first group of intensity values fall. In the examples shown in FIGS. 5A-5B, the adaptive threshold is set to indicate 95% of the intensity values present in a specific first group of intensity values. Each second group of intensity values thus includes only the top 5% of intensity values present in a given first group of intensity values.

The exemplary method further includes comparing the second group of intensity values to an intensity map, e.g. intensity map 300 of FIG. 3A. As described above, a representation of the second group of intensity values, such as exemplary representation 700, is compared to a portion of the intensity map 300, such as exemplary portion 702, as shown in FIG. 7. The method further includes generating a localized vehicle position, such as the position of vehicle 706 in FIG. 7, based on the comparison between the second group of intensity values and the intensity map 300. The intensity-based localization system and methods described above can improve the accuracy of the position of a vehicle for use with autonomous navigation, as shown in FIG. 7 by comparing the position of vehicle 704 and the position of vehicle 706.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An autonomous vehicle navigation system using intensity-based localization, comprising:
   one or more sensors disposed on a vehicle; and
   a computing device in communication with the one or more sensors, comprising:
      one or more processors for controlling the operations of the computing device; and
      a memory for storing data and program instructions used by the one or more processors, wherein the one or more processors are configured to execute instructions stored in the memory to:
         receive data including a plurality of intensity values from the one or more sensors as the vehicle traverses a route;
         generate a histogram using a first group of intensity values wherein the first group of intensity values includes at least some of the plurality of intensity values received;
         remove the intensity values below an adaptive threshold from the first group of intensity values to generate a second group of intensity values wherein the adaptive threshold is the intensity value below which a fixed percentage of the first group of intensity values fall on the histogram;
         compare the second group of intensity values to an intensity map; and
         generate a localized vehicle position based on the comparison between the second group of intensity values and the intensity map.

2. The system of claim 1 wherein at least one of the sensors measures laser returns from physical objects in the area surrounding the vehicle and the intensity values represent the brightness of the laser returns.

3. The system of claim 1 wherein at least one of the sensors measures vehicle position in global coordinates based on data from one or more satellites.

4. The system of claim 3 wherein a portion of the intensity map is compared to the second group of intensity values and wherein the portion of the intensity map compared to the second group of intensity values is selected based on an estimate of the vehicle's position in global coordinates.

5. The system of claim 1 wherein the intensity map is based on intensity values previously captured along the route that the vehicle is currently traversing.

6. The system of claim 1 wherein the first group of intensity values includes intensity values captured within a predetermined distance from the vehicle as the vehicle traverses the route.

7. The system of claim 1 wherein the fixed percentage is ninety five percent.

8. A computer-implemented method for autonomous vehicle navigation using intensity-based localization, comprising:

receiving data including a plurality of intensity values from one or more sensors disposed on a vehicle as the vehicle traverses a route;

generating a histogram using a first group of intensity values wherein the first group of intensity values includes at least some of the plurality of intensity values received;

removing the intensity values below an adaptive threshold from the first group of intensity values to generate a second group of intensity values wherein the adaptive threshold is the intensity value below which a fixed percentage of the first group of intensity values fall on the histogram;

comparing the second group of intensity values to an intensity map; and generating a localized vehicle position based on the comparison between the second group of intensity values and the intensity map.

9. The method of claim 8 wherein at least one of the sensors measures laser returns from physical objects in the area surrounding the vehicle and the intensity values represent the brightness of the laser returns.

10. The method of claim 8 wherein at least one of the sensors measures vehicle position in global coordinates based on data from one or more satellites.

11. The method of claim 10 wherein a portion of the intensity map is compared to the second group of intensity values and wherein the portion of the intensity map compared to the second group of intensity values is selected based on an estimate of the vehicle's position in global coordinates.

12. The method of claim 8 wherein the intensity map is based on intensity values previously captured along the route that the vehicle is currently traversing.

13. The method of claim 8 wherein the first group of intensity values includes intensity values captured within a predetermined distance from the vehicle as the vehicle traverses the route.

14. The method of claim 8 wherein the fixed percentage is ninety five percent.

15. A computing device, comprising:
one or more processors for controlling the operations of the computing device; and
a memory for storing data and program instructions used by the one or more processors, wherein the one or more processors are configured to execute instructions stored in the memory to:

receive data including a plurality of intensity values from one or more sensors disposed on a vehicle as the vehicle traverses a route;

generate a histogram using a first group of intensity values wherein the first group of intensity values includes at least some of the plurality of intensity values received;

remove the intensity values below an adaptive threshold from the first group of intensity values to generate a second group of intensity values wherein the adaptive threshold is the intensity value below which a fixed percentage of the first group of intensity values fall on the histogram;

compare the second group of intensity values to an intensity map; and generate a localized vehicle position based on the comparison between the second group of intensity values and the intensity map.

16. The computing device of claim 15 wherein at least one of the sensors measures laser returns from physical objects in the area surrounding the vehicle and the intensity values represent the brightness of the laser returns.

17. The computing device of claim 15 wherein at least one of the sensors measures vehicle position in global coordinates based on data from one or more satellites.

18. The computing device of claim 17 wherein a portion of the intensity map is compared to the second group of intensity values and wherein the portion of the intensity map compared to the second group of intensity values is selected based on an estimate of the vehicle's position in global coordinates.

19. The computing device of claim 15 wherein the intensity map is based on intensity values previously captured along the route that the vehicle is currently traversing.

20. The computing device of claim 15 wherein the fixed percentage is ninety five percent.

* * * * *